United States Patent [19]
Prisk et al.

[11] 3,730,812
[45] May 1, 1973

[54] HEAT SEALING DIE

[75] Inventors: Bert C. Prisk, Grosse Pointe Woods; Raymond Kenneth Erickson, Warren; Marion E. Wheatley, Sterling Heights, all of Mich.

[73] Assignee: General Motors Corporation, Detroit, Mich.

[22] Filed: Dec. 14, 1970

[21] Appl. No.: 97,522

[52] U.S. Cl. ................156/380, 156/583, 161/109, 161/186, 161/215, 161/DIG. 7
[51] Int. Cl. ......................B30b 15/02, B30b 15/34
[58] Field of Search................161/186, 215, 109, 161/111, 114, 115, DIG. 7; 156/380, 580, 583

[56] References Cited

UNITED STATES PATENTS

| | | | |
|---|---|---|---|
| 3,655,487 | 4/1972 | Farkas | 156/380 |
| 3,660,210 | 5/1972 | Chapman | 156/583 |
| 3,657,055 | 4/1972 | Nichols | 156/583 |
| 3,674,601 | 7/1972 | Goldsworthy | 156/380 |
| 3,674,602 | 7/1972 | Keogh et al. | 156/583 |
| 3,676,285 | 7/1972 | Agens et al. | 161/186 X |
| 3,681,170 | 8/1972 | Pevitt | 156/583 X |
| 3,393,117 | 7/1968 | Zolg et al | 161/215 X |
| 2,638,964 | 5/1953 | Andina | 156/580 X |
| 2,741,296 | 4/1956 | Collins | 156/380 |
| 2,683,839 | 7/1954 | Beck | 161/DIG. 7 |
| 3,042,591 | 7/1962 | Cado | 161/DIG. 7 |
| 3,228,091 | 1/1966 | Rice et al. | 29/155.5 |

OTHER PUBLICATIONS

I.B.M. Technical Disclosure Bulletin, "Landless Hole Circuit Card", Vol. 9, No. 10, March 1967, by Crimi et al, pages 1310 & 1311

Primary Examiner—Harold Ansher
Attorney—Peter P. Kozak and Sidney Carter

[57] ABSTRACT

A dielectric die for use in heat sealing thermoplastic sheets comprising a laminate consisting of a rigid thermoset resin sheet having thin metal layers bonded to each side thereof with the metal layers being electrically connected through the thermoset resin layer at a plurality of locations. One of the copper layers has portions etched away to form an electrode of a desired configuration. The other metal layer is adapted for electrical connection to a source of electrostatic microwave energy. The invention includes a method for making the die which includes the steps of electrically connecting the metal sheets by drilling holes through the laminate and electroplating an electrical conducting metal in the holes, and etching away portions of one of the metal sheets to form an electrode of the desired configuration.

3 Claims, 5 Drawing Figures

Patented May 1, 1973

3,730,812

INVENTORS
Bert C. Prisk,
Raymond K. Erickson Jr. &
BY Marion E. Wheatley

Peter P. Kozak
ATTORNEY

HEAT SEALING DIE

This invention relates to the art of heat sealing plastic materials and more particularly to dies for use in heat sealing or welding together thermoplastic sheets by means of a high frequency electric field.

As is known in the art when a thermoplastic material with high dielectric characteristics is placed in a high frequency electric field in the range of about 1 to 100 megacycles, heat is developed in the thermoplastic material. If the field is strong enough and is directed in a concentrated area of the thermoplastic material as, for example, by means of dies or electrodes, sufficient heat is developed to cause melting of the thermoplastic material at the point of contact of the thermoplastic material and the electrode. This phenomenon is the basis for heat sealing or welding of plastic sheets and is generally known in the art as dielectric heating.

The dies or electrodes which are used to concentrate the high frequency energy on the area of the thermoplastic sheets to be sealed, are usually made of brass and are from 1 to 1¼ inch thick. Successful heat sealing of thermoplastic sheets requires that the die faces be perfectly flat. It is apparent that dies of complicated shapes having suitably flat surfaces are expensive to fabricate since this work is usually done by machining or similar mechanical working.

During the sealing operation considerable pressure is applied to the plastic sheets by means of the electrodes or dies to insure intimate contact at the sealing area of the thermoplastic sheets. The die pressures, therefore, cause the softened thermoplastic sheets to flow to a considerable extent with the result that the thickness of the heated area is typically reduced by 25 to 50 percent with a corresponding reduction in strength of the thermoplastic sheets at the edges of the seam or weld.

It is an object of this invention to provide a die for use in heat sealing together a plurality of thermoplastic sheets by dielectric heating which is relatively simple and economical to manufacture and which may have a complex working face configuration with a high degree of planar accuracy or flatness to provide a satisfactory continuous seam over an extensive area in heat sealing use.

It is a further object of this invention to provide a heat sealing die which is effective in applying suitable pressure to the thermoplastic sheet material at the working surface of the die without appreciably reducing the thickness of the plastic material at the welded joint whereby the stronger welded joints are obtained.

It is an important object of this invention to provide a relatively simple and economical method of making dies in accordance with the foregoing objects.

These and other objects are preferably accomplished by a method which includes the steps of providing a laminate consisting of a rigid thermoset resin layer of substantial thickness having a relatively thin metal layer bonded to each side of the thermoset resin layer. Laminates of this kind are typically used in the manufacture of printed circuits. Portions of one of the metal layers are etched away to form a configuration or pattern in the shape in which it is desired to heat seal thermoplastic materials. Next, holes are formed through the laminate at selected points and a suitable metal is electrodeposited on the walls of the holes to form an efficient electrical connection between the metal layers. The etched metal layer forms the working surface or electrode of the die while the unetched layer provides electrical conductor means for distributing electrical energy to the various portions of the working surface through the electrodeposited electrical connections so as to provide a uniform distribution of microwave energy on the working or electrode surfaces of the die. The die thus formed is attached to the press of a heat sealing apparatus and electrical connections are provided between the unetched metal layer of the die and a source of high frequency energy. In heat sealing use the thermoplastic material is deformed only to the extent of thickness of the metal layer of the die so that significant thinning out of the plastic material in the weld area is avoided.

Other objects and advantages will be apparent from the following description of the invention reference being made to the drawings in which FIG. 1 is a perspective view of a rigid flat laminate consisting of a rigid thermoset resin layer having a thin metal layer bonded to each side thereof.

With the development of technology in the field of plastic materials, there is an increasingly greater need to develop plastic fabrication techniques as for example the art of heat sealing sheets of thermoplastic materials for making a variety of useful articles. For example, an important article of this type is a blood pump for use in performing heart operations such as is disclosed in the U. S. Pat. application Ser. No. 38,353 Bert C. Prisk filed May 18, 1970. The fabrication of a pump of this kind involves a sturdy heat formed seam having a relatively complex configuration through a plurality of thermoplastic sheets. Since articles of this type are manufactured in relatively low volume, it is desirable to provide economically made heat sealing dies which will make efficient seams of complex configuration.

Figure 1:
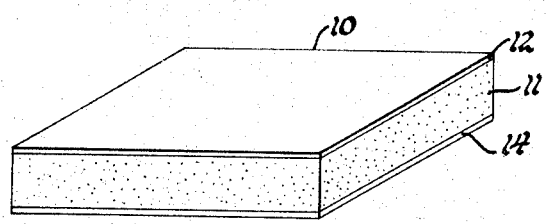

Referring to FIG. 1 of the drawings, a die made in accordance with this invention involves the use of a laminated structure 10 consisting of a relatively thick rigid thermoset resin layer 11 having bonded to each side thereof relatively thin copper layers 12 and 14. A suitable laminate of this type has a thermosetting resin layer 11 which is a glass fiber reinforced epoxy resin sheet about 1/16 inch thick. Other suitable rigid thermoset resins such as phenolic resins may be used. The copper layers 12 and 14 are approximately 0.003 inch thick. Laminates of this type are commonly used in the fabrication of the so-called printed electrical circuits. These laminates are well known to those skilled in the art and are available commercially.

Figure 2:
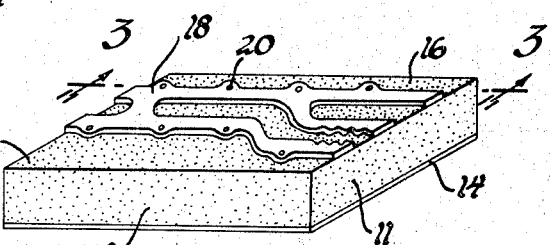
FIG. 2 is a perspective view of the laminate shown in FIG. 1 with one metal layer thereof having portions etched away to form a metal pattern of the desired configuration to be heat sealed.

In general, in accordance with the method of this invention one of the copper layers, as for example the layer 12, has portions as indicated generally at 16 etched away to leave an unetched portion or pattern 18 having the configuration of the seam desired in a heat sealed article. The design shown in FIG. 2 is generally of the form utilized in the aforesaid U.S. patent application and is shown here for illustrative purposes only. The unetched portion 18 as will be apparent hereinafter forms the working surface or electrode of the die of this invention. Holes or openings 20 are then drilled entirely through the laminate 10 and a layer of copper is electrodeposited on the walls of the openings 20 to provide an electrical contact between the pattern 18 and the opposite copper layer 14. The openings 20 are provided at carefully selected locations to insure the electrical continuity in the electrical field and a uniform distribution of the microwave energy in the areas to be welded.

More specifically, the die is made as follows: The surface of the layer 12 is first cleaned to remove all organic contaminants. This is satisfactorily done by scrubbing it with an abrasive material such as pumice or an abrasive cleaner. The surface of the layer 12 is then etched for about 15 seconds in an aqueous solution of cuprous chloride and hydrochloric acid and rinsed with water. This etch and rinse is applied to remove any residual contaminants.

Next the desired pattern is preferably formed on the copper layer 12 by the standard and well known photoetching technique. Accordingly, a light sensitive plastic material or photoresist material layer is sprayed over the copper layer 12 and permitted to dry. A photographic negative having an exposed portion in the configuration of the pattern 18 is placed over the light sensitive plastic layer and the assembly is placed in a vacuum frame to cause tight adherence and coextensive contact of the negative with the light sensitive resin layer. The negative is then exposed to ultraviolet light whereby the portions of the light sensitive resin lying beneath the negative are caused to polymerize.

The assembly is then removed from the vacuum fixture and a photographic developer solution is applied to the light sensitive resin layer whereby the unexposed or unpolymerized portions of the light sensitive layer are removed.

Next the holes 20 are precision drilled through the laminate 10 including the polymerized resin layer not removed by the developer. These holes are carefully located and distributed in number as aforementioned to provide suitable electrical energy distribution.

Figure 3:
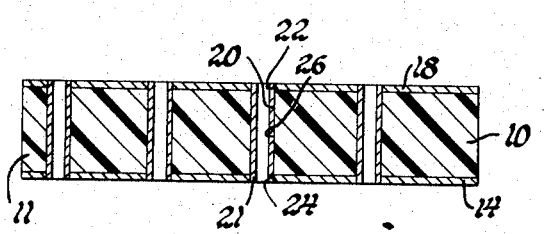
FIG. 3 is a cross-sectional view of FIG. 2 taken along line 3—3.

The foregoing procedure is used to properly locate and drill the holes 20 through the laminate as shown in FIG. 3. Next a cylindrical layer of copper 21 is electroplated within the holes 20 onto the edges 22 and 24 of the copper sheets 12 and 14, respectively, and on the walls 26 of the epoxy resin layer 11 to provide suitable electrical connection between the copper sheets 12 and 14. This is accomplished as follows:

The laminate or assembly 10 with the holes 20 drilled therein is again scrubbed, etched for 45 seconds in an aqueous solution of a cuprous chloride and hydrochloride acid and rinsed in water. The assembly is then immersed in a solution of stannous chloride for five minutes to sensitize the epoxy resin surface 26 of the holes 20, rinsed in water and then immersed in a solution of palladium chloride for 5 minutes. The assembly is then rinsed in water and immersed in an electroless copper plating bath for about 10 minutes and again rinsed in water. Thereafter, a layer of copper 21 about 0.003 inch thick is electroplated on the surface 26 and the edges 22 and 24 whereby the copper plates 10 and 12 are electrically connected by a cylindrical layer 21 of copper within the holes 20.

In the above described procedure the assembly 10 is immersed in the stannous chloride solution to sensitize the surface 18 of the holes 20 for receiving palladium when the assembly is immersed in the palladium chloride bath. The palladium coating provides a surface for receiving an electroless copper flash which in turn provides a suitable electrical conducting surface for receiving the electroplated copper layer 21. The above described technique is well known in the art and those skilled in the art will be readily able to provide the various immersion baths in suitable concentrations to practice the process described.

The final step in the method includes the steps of again printing the desired pattern on the copper layer 12 precisely in the position previously printed. To this end, the copper layer 10 is again cleaned and sprayed with the light sensitive resin and permitted to dry. The negative is again placed over the copper layer 12 precisely as before and placed in a vacuum frame. The light sensitive resin is again exposed to ultraviolet light to polymerize the resin under the exposed portion of the negative and the assembly is then removed from the vacuum frame. Next the surface of the copper layer 14 is stopped off with a suitable masking material such as Scotch Brand Tape. Finally the assembly is exposed to a ferric chloride solution whereby the portions 16 of the copper layer 12 lying beneath the unpolymerized portions of the light sensitive resin are etched away leaving those portions lying under the exposed or polymerized portions of the light sensitive resin to provide a die surface or electrode 18 about 0.003 inch of the desired configuration.

Figure 4:
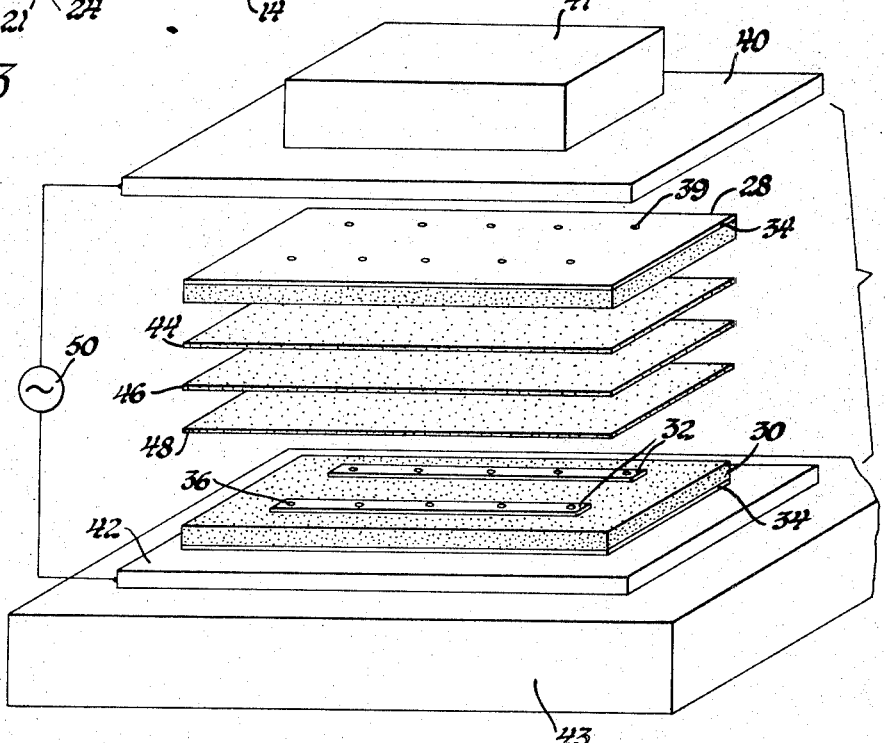
FIG. 4 is a schematic view of a dielectric heat sealing apparatus including the dies of this invention.

The exploded view of FIG. 4 illustrates one method of using dies of this invention for heat sealing thermoplastic sheets. In this embodiment a pair of dies 28 and 30 are made as above described which are mirror images of one another. For the sake of simplicity the electrodes 32 of the lower die 30 formed by the etching procedure described above are shown in the form of a pair of elongated bars which are connected to the unetched copper layer 34 through the plated openings 36 formed in the manner above described. Similarly the electrodes 33 (shown in FIG. 5) of the upper die 28 are connected to the unetched copper layer 34 of the upper die 28 through the plated openings 39.

The upper die 28 is attached to the movable upper platen 40 which in turn is supported by movable hydraulic press means 41 and similarly the lower die 30 is attached to the fixed lower platen 42 which in turn is supported by the stationary support 43. The unetched copper layer 34 of the upper die 28 and the unetched copper layer 34 of the lower die 30 are electrically connected to the platens 40 and 42 respectively which are connected to a high frequency electrostatic field generator 50 so that a high frequency charge impressed across the upper and lower platens 40 and 42 respectively imposes a charge on the electrodes 32 and 33.

Figure 5:
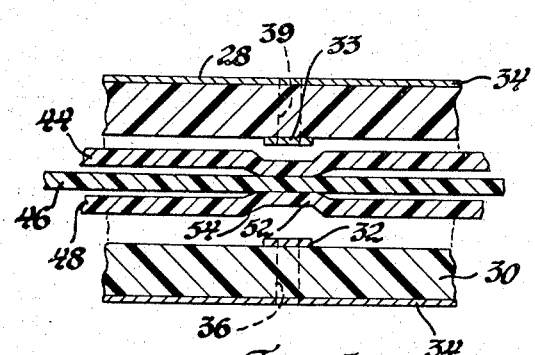
FIG. 5 is a pair of dies in accordance with this invention and a heat formed seam formed by the dies shown in cross-section.

In operating the dielectric sealing apparatus shown in FIG. 4, three thermoplastic sheets as, for example, 44, 46 and 48, are inserted between the dies between 28 and 30. The platen 40 is brought down under pressure against the thermoplastic sheets and the lower die 30. The micro.wave energy of about 45 megacycles is then applied at about 10kw for a period of about 2 seconds whereby a seam 52 is obtained as shown in FIG. 5. It will be noted that the electrodes 32 and 33 compress and deform the sheets only slightly to the extent of about 0.003 inch as indicated in the seam area 52 whereby the sheets adjacent the seam as at 54 are not materially reduced in cross-section and are not materially weakened in the seam area.

Dies made in accordance with this invention may be satisfactorily used in dielectric sealing apparatus using microwave energy of 27 to 70 megacycles and preferably 27 to 70 megacycles at 1 to 100kw.

The dies of this invention are useful for heat sealing thermoplastic sheet material having a melting point in the range of about 200° to 300°F such as polyethylene, polyvinyl chloride and polypropylene polymers.

While a specific method has been described for plating an electrical conductor in the holes 20 of FIG. 2 to provide an electrical connection between the electrode portions 18 and the unetched sheet 14 of the dies and for etching away undesired portions of the dies 16, it is apparent that other methods may be used within the spirit of this invention.

It is claimed:

1. A die for dielectrically heat sealing thermoplastic sheets comprising
   a rigid thermoset resin sheet of uniform thickness,
   a first relatively thin layer of electrically conductive metal bonded to one side of said resin sheet,
   a second relatively thin layer of electrically conductive metal bonded to the other side of said resin sheet having a configuration of the desired pattern in which it is desired to heat seal,
   said resin sheet and said metal sheets having openings therethrough at a plurality of locations, the walls of said openings having an electrically conductive metal layer deposited thereon whereby said first metal layer is electrically connected to said second metal layer at said plurality of locations, said locations being distributed to provide a uniform distribution of electrical charge on said second metal layer when said first metal layer is subjected to an electrostatic charge.

2. A die for dielectrically heat sealing thermoplastic materials comprising
   a rigid thermoset resin sheet of uniform thickness,
   a copper sheet about 0.003 inch in thickness bonded to one side of said resin sheet,
   a second sheet of copper about 0.003 inch in thickness bonded to the opposite side of said resin sheet, said second sheet having a configuration of the desired pattern in which it is desired to heat seal with said die,
   said resin sheet and said metal sheets having openings therethrough at a plurality of locations, the walls of said openings having an electrodeposited copper layer thereon whereby said first copper sheet is electrically connected to said second copper sheet at said plurality of locations, said locations being distributed to provide a uniform distribution of electrical charge on said second copper sheet when said first copper sheet is subjected to an electrostatic charge.

3. A dielectric heat sealing apparatus for heat sealing thermoplastic sheets comprising a stationary platen and a movable platen and a die mounted on one of said platens,
   said die comprising a rigid thermoset resin sheet of uniform thickness,
   a first relatively thin layer of electrically conductive metal bonded to one side of said resin sheet and being in contact with said one of said platens,
   a second relatively thin layer of electrically conductive metal bonded to the other side of said resin sheet having a configuration of the pattern in which it is desired to heat seal,
   said resin sheet and said metal sheets having openings therethrough at a plurality of locations, the walls of said openings having an electrically conductive metal layer thereon whereby said first metal layer is electrically connected to said second metal layer at said plurality of locations, said locations being distributed to provide a uniform distribution of electrical charge on said second metal layer when said first metal layer is subjected to an electrical charge and said second metal layer being adapted to serve as an electrode when said first metal layer is subjected to an electrostatic charge.

* * * * *